(12) United States Patent
Ujikane (10) Patent No.: US 10,165,160 B2
(45) Date of Patent: Dec. 25, 2018

(54) ELECTRONIC DEVICE INCLUDING REMOVABLE TERMINAL COVER UNIT AND JOINT PORTION

(71) Applicant: Panasonic Intellectual Property Management Co., Ltd., Osaka (JP)

(72) Inventor: Yukikazu Ujikane, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/426,133

(22) Filed: Feb. 7, 2017

(65) Prior Publication Data

US 2017/0150016 A1    May 25, 2017

Related U.S. Application Data

(63) Continuation of application No. PCT/JP2016/003248, filed on Jul. 8, 2016.

(30) Foreign Application Priority Data

Aug. 6, 2015    (JP) ................................. 2015-155736

(51) Int. Cl.
*H04N 5/225* (2006.01)
*G03B 17/56* (2006.01)
*G03B 17/02* (2006.01)

(52) U.S. Cl.
CPC .......... *H04N 5/2252* (2013.01); *G03B 17/02* (2013.01); *G03B 17/56* (2013.01); *G03B 2206/00* (2013.01)

(58) Field of Classification Search
CPC ...... H04N 5/2252; G03B 17/02; G03B 17/56; G03B 2206/00; G06F 13/00

USPC .................................................. 348/373-376
See application file for complete search history.

(56) References Cited

U.S. PATENT DOCUMENTS

| | | | | |
|---|---|---|---|---|
| 4,903,062 A | * | 2/1990 | Kirigaya ................ | G03B 17/02 396/287 |
| 5,473,401 A | * | 12/1995 | Tsunefuji ............... | G03B 17/02 396/536 |
| 5,617,172 A | * | 4/1997 | Ohta ...................... | G03B 17/02 396/539 |
| 5,621,493 A | * | 4/1997 | Wada ..................... | G03B 17/02 396/387 |

(Continued)

FOREIGN PATENT DOCUMENTS

| JP | 7-203288 | 8/1995 |
|---|---|---|
| JP | 2013-041268 | 2/2013 |
| JP | 2015-125204 | 7/2015 |

OTHER PUBLICATIONS

Nikon D70 Camera Model—digital camera resource page (DCRP) review, p. 12—Dec. 31, 2005.*

(Continued)

*Primary Examiner* — Twyler Haskins
*Assistant Examiner* — Akshay Trehan
(74) *Attorney, Agent, or Firm* — Renner Otto Boisselle & Sklar, LLP (57) ABSTRACT

Provided is a digital camera including: a camera body including a terminal for connection with an external device; and a terminal cover unit including a terminal casing having a terminal opening corresponding to the terminal and a terminal cover which protects the terminal. The terminal cover unit is attachable to and detachable from the camera body from outside the camera body.

10 Claims, 7 Drawing Sheets

(56) References Cited

U.S. PATENT DOCUMENTS

| | | | | |
|---|---|---|---|---|
| 5,708,856 A * | 1/1998 | Cloutier | | G03B 17/02 396/536 |
| 5,732,305 A * | 3/1998 | Satou | | G03B 17/02 396/541 |
| 5,752,087 A * | 5/1998 | Sangregory | | G03B 17/02 396/539 |
| 5,959,669 A * | 9/1999 | Mizoguchi | | H04N 5/2251 348/342 |
| 5,983,040 A * | 11/1999 | Watanabe | | G03B 17/02 16/74 |
| 6,327,441 B1 * | 12/2001 | Alligood | | G03B 17/02 396/442 |
| 6,742,943 B2 * | 6/2004 | Ushiro | | G03B 17/00 348/360 |
| 7,372,501 B2 * | 5/2008 | Fujii | | G03B 17/04 348/373 |
| 7,611,371 B2 * | 11/2009 | Guo | | H01R 13/447 439/367 |
| 7,889,985 B2 * | 2/2011 | Misawa | | G03B 13/18 348/345 |
| 8,379,144 B2 * | 2/2013 | Nam | | H01M 2/1022 348/375 |
| 8,837,928 B1 * | 9/2014 | Clearman | | E05B 17/2019 206/316.2 |
| 2005/0020126 A1 * | 1/2005 | Shinohara | | G03B 17/02 439/515 |
| 2005/0024526 A1 * | 2/2005 | Wang | | H04N 5/2252 348/373 |
| 2005/0062882 A1 * | 3/2005 | Iwai | | H04N 5/2252 348/375 |
| 2006/0026615 A1 * | 2/2006 | Sugimura | | G11B 17/051 720/658 |
| 2006/0188249 A1 * | 8/2006 | Noguchi | | G03B 17/02 396/536 |
| 2007/0205208 A1 * | 9/2007 | Ueda | | G03B 17/02 220/813 |
| 2008/0252752 A1 * | 10/2008 | Kosaka | | H04N 5/2252 348/231.99 |
| 2009/0136228 A1 * | 5/2009 | Mayumi | | G03B 17/02 396/535 |
| 2009/0161007 A1 * | 6/2009 | Okuda | | H04N 5/2251 348/376 |
| 2010/0014227 A1 * | 1/2010 | Kobayashi | | H04N 5/2252 361/679.01 |
| 2010/0242367 A1 * | 9/2010 | Kawai | | G03B 17/02 49/348 |
| 2010/0265388 A1 * | 10/2010 | Soumi | | G03B 17/02 348/374 |
| 2010/0297485 A1 * | 11/2010 | Ren | | H01M 2/1066 429/100 |
| 2011/0149144 A1 * | 6/2011 | Sato | | G03B 17/00 348/375 |
| 2011/0195761 A1 * | 8/2011 | Lee | | G03B 17/02 455/575.4 |
| 2011/0216237 A1 * | 9/2011 | Shinohara | | G03B 17/02 348/373 |
| 2011/0298969 A1 * | 12/2011 | Lin | | H05K 5/0239 348/373 |
| 2012/0134661 A1 * | 5/2012 | Ozaki | | G03B 17/02 396/535 |
| 2012/0154665 A1 * | 6/2012 | Kaga | | G03B 13/02 348/335 |
| 2013/0016482 A1 * | 1/2013 | Fukuhara | | G03B 17/02 361/725 |
| 2013/0141637 A1 * | 6/2013 | Kaga | | E06B 7/22 348/373 |
| 2014/0061216 A1 * | 3/2014 | Lee | | H05K 5/0226 220/837 |
| 2014/0063336 A1 * | 3/2014 | Choi | | G03B 17/02 348/374 |
| 2015/0168816 A1 * | 6/2015 | Fujiwara | | G03B 17/563 348/375 |
| 2015/0249235 A1 * | 9/2015 | Kawashima | | H01M 2/1022 429/100 |
| 2015/0334275 A1 * | 11/2015 | Ishikawa | | H04N 5/23245 348/376 |
| 2016/0174408 A1 * | 6/2016 | Tolbert | | H05K 1/0209 348/373 |
| 2017/0279224 A1 * | 9/2017 | Chapel | | H01R 13/639 |

OTHER PUBLICATIONS

Canon EOS 1200D DSLR (EOS Rebel T5) camera model instruction manual, pertinent pp. 1, 22, 222, 342, published on Apr. 2015 and Canon camera model screenshot.*

International Search Report of PCT application No. PCT/JP2016/003248 dated Aug. 9, 2016.

* cited by examiner

ELECTRONIC DEVICE INCLUDING REMOVABLE TERMINAL COVER UNIT AND JOINT PORTION

BACKGROUND

1. Technical Field

The present disclosure relates to an electronic device, such as a digital camera, which includes a terminal for connection with an external device, and relates also to a terminal cover unit.

2. Description of the Related Art

Japanese Unexamined Patent Application Publication No. 2013-41268 (Patent Literature 1) discloses a digital camera including terminals for connecting with an external device and a terminal cover for protecting the terminals. An outer lid, which is the terminal cover, of the digital camera disclosed in Patent Literature 1 is anchored to a case projection portion of the front case, so that the outer lid is not removed from the casing.

SUMMARY

The present disclosure provides an electronic device which allows easy replacement of a terminal cover.

An electronic device according to the present disclosure includes: an electronic device body including a terminal for connection with an external device; and a terminal cover unit including a terminal casing having an opening corresponding to the terminal and a terminal cover which protects the terminal. The terminal cover unit is attachable to and detachable from the electronic device body from outside the electronic device body.

The electronic device according to the present disclosure allows easy replacement of a terminal cover.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION

Hereinafter, non-limiting embodiments will be described in detail with reference to the drawings as necessary. However, unnecessarily detailed descriptions may be omitted. For example, detailed descriptions of well-known aspects or repetitive descriptions of essentially the same configurations may be omitted. This is to avoid unnecessary redundancy and make the following description easier for those skilled in the art to understand.

It should be noted that the accompanying drawings and the following description are provided, not to limit the subject matter recited in the claims, but to aid a person skilled in the art to adequately understand the present disclosure.

Hereinafter, non-limiting embodiments will be described with reference to FIG. 1 through FIG. 7.

Figure 1:
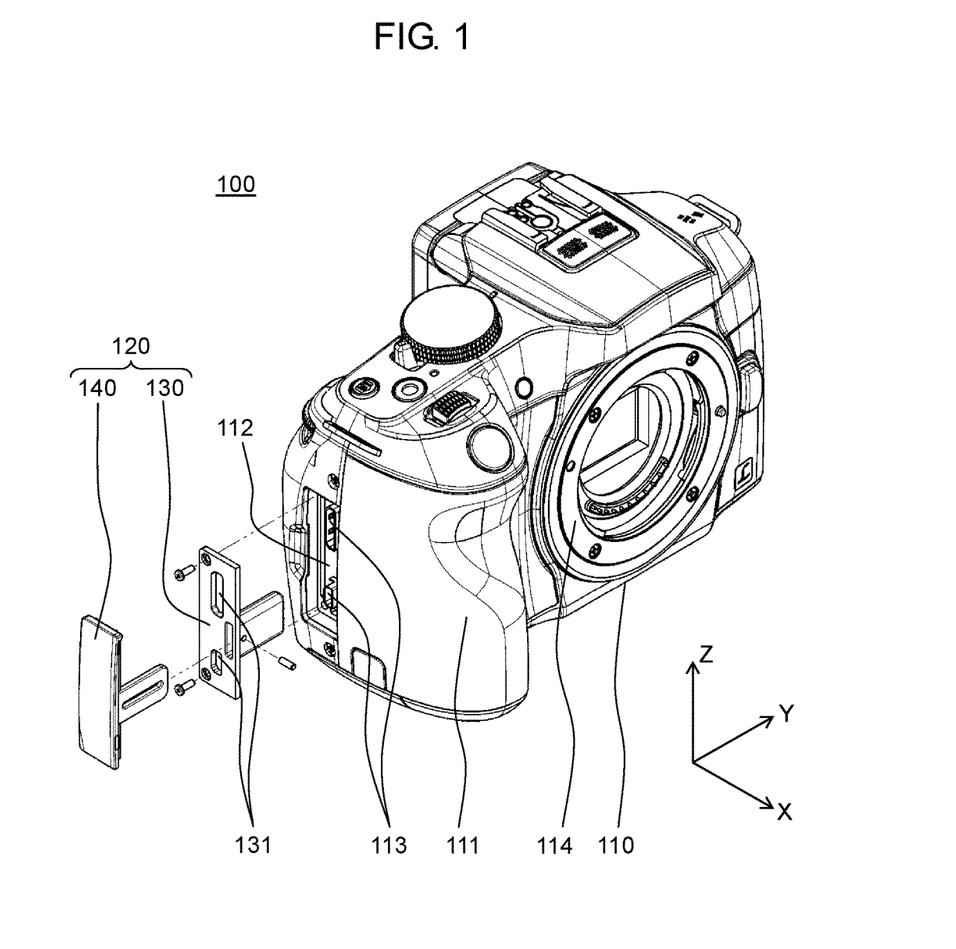
FIG. 1 is a perspective view of a digital camera according to an embodiment, with a terminal cover unit detached from the camera body.

FIG. 1 is a perspective view of digital camera 100 according to the present embodiment, with terminal cover unit 120 detached from camera body 110. In FIG. 1, terminal cover unit 120 is separated into terminal casing 130 and terminal cover 140. As illustrated in FIG. 1, digital camera 100 includes camera body 110 and terminal cover unit 120 which is attachable to and detachable from camera body 110 from outside camera body 110. Camera body 110 is covered by body casing 111, and includes terminals 113 for connection with an external device, lens mount 114, and a shutter button, for example. Terminal cover unit 120 includes terminal casing 130 and terminal cover 140 which is separably joined with terminal casing 130. Digital camera 100 excluding terminal cover unit 120 corresponds to camera body 110. Terminal cover unit 120 can be attached to and detached from camera body 110 from outside camera body 110 without having to disassemble camera body 110.

Digital camera 100 is an interchangeable lens digital camera and can take a picture of a subject by having a lens (not shown) attached to lens mount 114.

Figure 2:
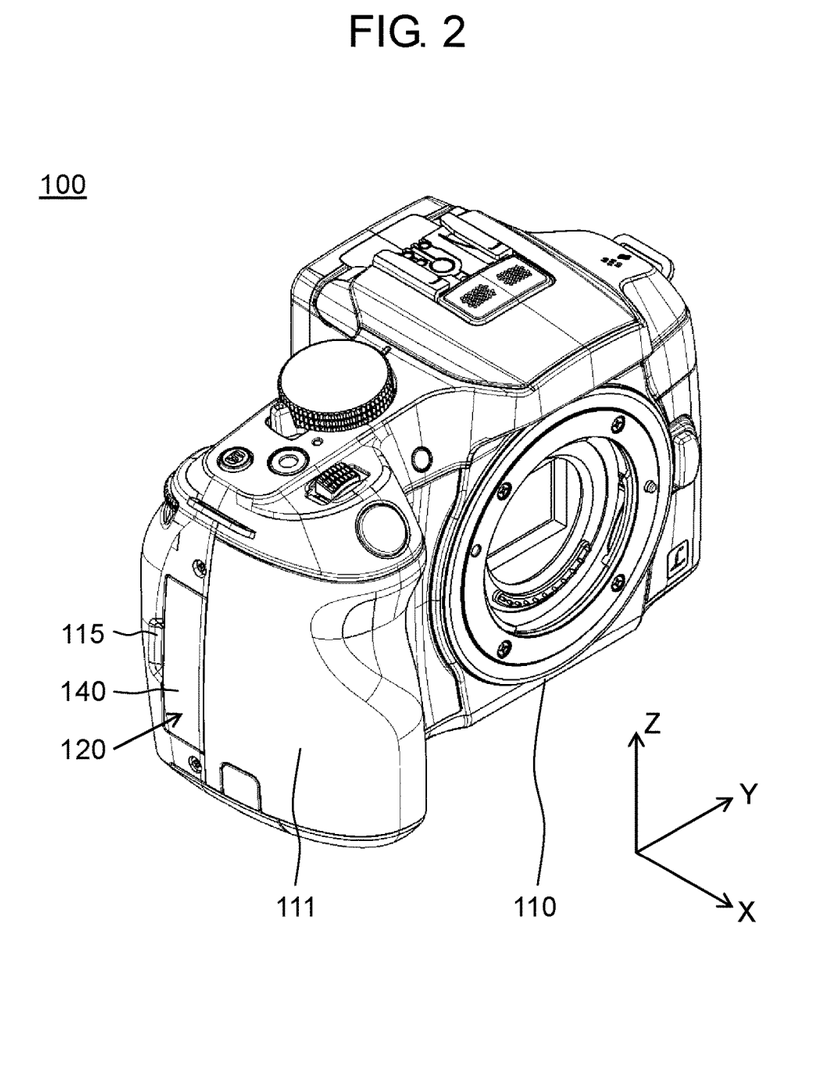
FIG. 2 is a perspective view of a digital camera according to an embodiment, with a terminal cover unit attached to the camera body.

FIG. 2 is a perspective view of digital camera 100 according to the present embodiment, with terminal cover unit 120 attached to camera body 110. FIG. 2 illustrates a closed state of terminal cover unit 120, and when terminal cover unit 120 is attached to camera body 110, only terminal cover 140 is externally visible. That is to say, when terminal cover unit 120 is in the closed state, terminal casing 130 (see FIG. 1) is completely covered by terminal cover 140. Thus, terminal casing 130 is not externally visible when terminal cover unit 120 is in the closed state.

As will be described later, terminal cover unit 120 has a closed state and an open state. When terminal cover unit 120 is in the closed state, terminal cover 140 conceals and protects terminals 113 (see FIG. 1). When terminal cover unit 120 is in the open state, terminal cover 140 exposes terminals 113 so that digital camera 100 is ready to be connected with an external device.

Camera body 110 has recess 115 adjacent to the attachment position of terminal cover unit 120. Terminal cover unit 120 can be placed in the open state by a user engaging his/her finger with the rim of terminal cover 140 from recess 115 and pulling terminal cover 140 toward the outside of camera body 110.

Figure 3:
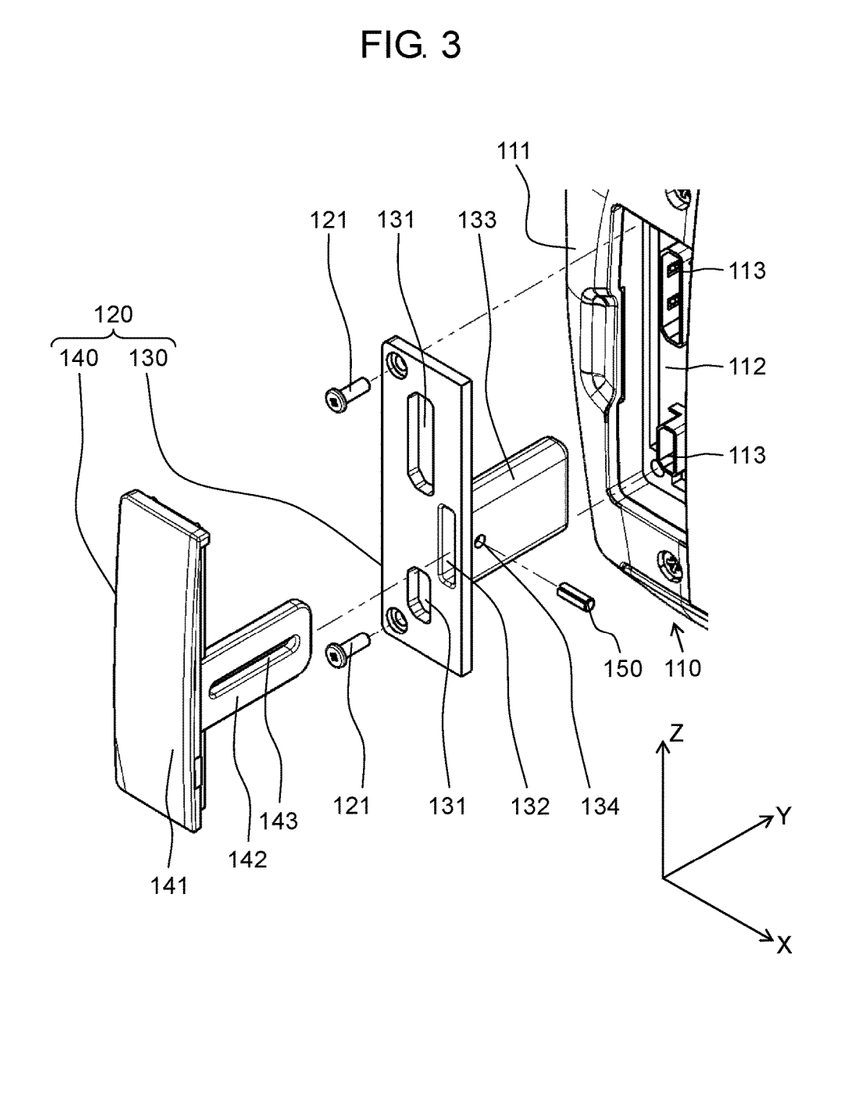
FIG. 3 is a perspective view illustrating the configuration of a terminal cover unit according to an embodiment.

FIG. 3 is a perspective view illustrating the configuration of terminal cover unit 120 according to the present embodiment. As illustrated in FIG. 3, terminal cover unit 120 includes terminal casing 130 and terminal cover 140 which is separably joined with terminal casing 130 using slide pin 150. Terminal casing 130 included in terminal cover unit 120 is detachably attached to camera body 110 using screws 121 from outside camera body 110.

Camera body 110 includes terminals 113 for connecting with an external device. Examples of terminals 113 for connecting with an external device include a power source terminal, a high definition multimedia interface (HDMI)® terminal, and a universal serial bus (USB) terminal. Body casing 111 covers camera body 110 except terminals 113 and the region around terminals 113. In the region of and around terminals 113 of camera body 110, body opening 112, which is a region not covered by body casing 111, is formed. Since body opening 112 is formed, the inner configuration in the region around terminals 113, such as the circuit board on which terminals 113 are mounted, is exposed when terminal cover unit 120 is detached from camera body 110.

Terminal casing 130 included in terminal cover unit 120 is a component separate from body casing 111 of camera body 110. Terminal casing 130 is fitted into body opening 112 formed in camera body 110. Digital camera 100 (see FIG. 1) is entirely covered by fitting terminal casing 130 into body opening 112 of camera body 110 covered by body casing 111. Terminal casing 130 is fitted to camera body 110 from outside camera body 110. In the case where body casing 111 covering camera body 110 is composed of a plurality of casing components, terminal casing 130 is fitted into body opening 112 of camera body 110 after the plurality of casing components are assembled and camera body 110 including body casing 111 having body opening 112 is configured. In the case where body casing 111 covering camera body 110 is composed of a single casing component, terminal casing 130, which is a separate component, is fitted into body opening 112 of camera body 110 which includes body casing 111 as the single component. Terminal casing 130 included in terminal cover unit 120 is attachable to and detachable from camera body 110 from outside camera body 110. It is thus unnecessary to disassemble camera body 110 or body casing 111 when attaching and detaching terminal cover unit 120.

Terminal casing 130 is detachably screwed into camera body 110 using screws 121. Terminal casing 130 can change between a state in which terminal casing 130 is attached to camera body 110 and a state in which terminal casing 130 is detached from camera body 110, by simple means such as screwing.

In the present embodiment, terminal casing 130 included in terminal cover unit 120 is detachably attached to camera body 110 from outside camera body 110. Thus, when a need to replace terminal cover 140 arises due to breakage, for example, it is possible to replace terminal cover 140 with great ease by detaching terminal cover unit 120 including terminal cover 140 and then replacing terminal cover 140, without having to disassemble camera body 110 or body casing 111. Furthermore, even when an artificial leather sheet is adhered to body casing 111, it is possible to replace terminal cover 140 with great ease without the trouble of having to strip off the artificial leather sheet, disassemble body casing 111, and replace terminal cover 140, and then assemble body casing 111 and adhere the artificial leather sheet again.

As illustrated in FIG. 3, terminal casing 130 included in terminal cover unit 120 includes terminal openings 131 having shapes corresponding to terminals 113, at positions in camera body 110 which correspond to terminals 113 for connecting with an external device. When terminal casing 130 is fitted into body opening 112 of camera body 110, terminals 113 are exposed from terminal openings 131. An external device and digital camera 100 are connected when a terminal of a connection cable of the external device is connected to terminal 113 via terminal opening 131. Terminal casing 130 further includes hinge opening 132 and hinge housing 133 which is continuous from hinge opening 132. Hinge housing 133 has support holes 134 for supporting slide pin 150.

Terminal cover 140 included in terminal cover unit 120 is formed using an elastic material. Terminal cover 140 includes protection lid 141 for concealing and protecting terminals 113, and hinge 142 extending from protection lid 141. When terminal cover unit 120 is in the closed state, protection lid 141 conceals and protects terminals 113 of camera body 110. Hinge 142 is elongated in the direction of slide movement of terminal cover 140, and has slide hole 143 having a shape elongated along the longitudinal direction of hinge 142. Terminal cover 140 is separably joined with terminal casing 130 using slide pin 150. Slide pin 150 is inserted into and passes through slide hole 143 formed in hinge 142 along which slide pin 150 makes slide movement, and supported by support holes 134 formed in hinge housing 133. Hinge housing 133 is a component shaped like a pocket for housing hinge 142. Support holes 134 formed in hinge housing 133 are a pair of support holes 134, one provided on the front surface and the other provided on the back surface of hinge housing 133 which is a component shaped like a pocket. That is to say, support holes 134 are made up of support hole 134 provided on the front surface of hinge housing 133 which is illustrated in FIG. 3 and support hole 134 provided on the back surface of hinge housing 133 which is not illustrated in FIG. 3.

Terminal cover 140 can make slide movement with respect to terminal casing 130 according to the length of slide hole 143, and can freely enter and exit camera body 110. In other words, hinge 142 also functions as a slide portion.

Terminal cover 140 includes an elastic material such as rubber or an elastomer. Thus, when terminal cover 140 is pulled toward the outside of camera body 110, hinge 142 can bend toward the front of camera body 110 so that protection lid 141 is not in the way of connection between terminal 113 and an external device.

The length of slide hole 143 can be set such that terminal cover 140 can be pulled to a position at which protection lid 141 does not get in the way of connection between terminal 113 and an external device. This facilitates the connection between terminal 113 and an external device.

It should be noted that slide hole 143 corresponds to a first hole according to the present disclosure, each of support holes 134 corresponds to a second hole according to the present disclosure, and slide pin 150 corresponds to a pass-through component according to the present disclosure.

Slide pin 150 can be freely and easily inserted into and removed from support holes 134 formed in hinge housing 133 and slide hole 143 formed in hinge 142. By removing slide pin 150 from support holes 134 and slide hole 143, terminal cover 140 can be easily separated from terminal casing 130. Terminal cover 140 and terminal casing 130 can be easily joined by slide pin 150 inserted into and supported by support hole 134 provided on the front surface of hinge housing 133 and support hole 134 provided on the back surface of hinge housing 133 while passing through slide hole 143 formed in hinge 142. In other words, a joint portion which joins terminal casing 130 and terminal cover 140 includes slide hole 143 (first hole) formed in terminal cover 140, support holes 134 (second hole) formed in terminal casing 130, and slide pin 150 (pass-through component) which is removably inserted into and passes through both slide hole 143 and support holes 134. Terminal casing 130 and terminal cover 140 are separably joined by the joint portion.

Since the present embodiment uses slide pin 150 which can be freely inserted and removed, it is possible to replace terminal cover 140 with another terminal cover 140 with ease when a need to replace terminal cover 140 arises due to breakage, for example. Although a spring pin which slightly shrinks in radial direction when inserted into support holes 134 may be used as slide pin 150, the present disclosure is not particularly limited, and a bolt and a nut, for example, can also be used.

When terminal cover unit 120 is attached to camera body 110, support holes 134 formed in hinge housing 133 are concealed inside digital camera 100. In other words, the joint portion which joins terminal casing 130 and terminal cover 140 is concealed inside digital camera 100 when terminal cover unit 120 is attached to camera body 110. Furthermore, the joint portion which joins terminal casing 130 and terminal cover 140 is concealed inside digital camera 100 both when terminal cover unit 120 is in the open state and when terminal cover unit 120 is in the closed state.

Thus, slide pin 150 cannot be removed from support holes 134 when terminal cover unit 120 is attached to camera body 110, meaning that terminal cover 140 cannot be separated from terminal casing 130. To separate terminal cover 140 from terminal casing 130, terminal cover unit 120 needs to be detached from camera body 110.

In the present embodiment, terminal cover 140 is separable from terminal casing 130, allowing replacement of terminal cover 140 with another terminal cover 140. In the present embodiment, terminal cover 140 is replaceable. According to the present embodiment, it is possible to replace terminal cover 140 with ease by detaching terminal cover unit 120 from camera body 110, without having to disassemble camera body 110. Furthermore, in the present embodiment, terminal cover 140 is separated from terminal casing 130 after terminal cover unit 120 is detached from camera body 110. According to the present embodiment, terminal cover 140 is not separated from camera body 110 unless terminal cover unit 120 is detached from camera body 110, and it is thus possible to reduce occurrence of a problem that terminal cover 140 is disjoined while digital camera 100 is in use.

Figure 4:
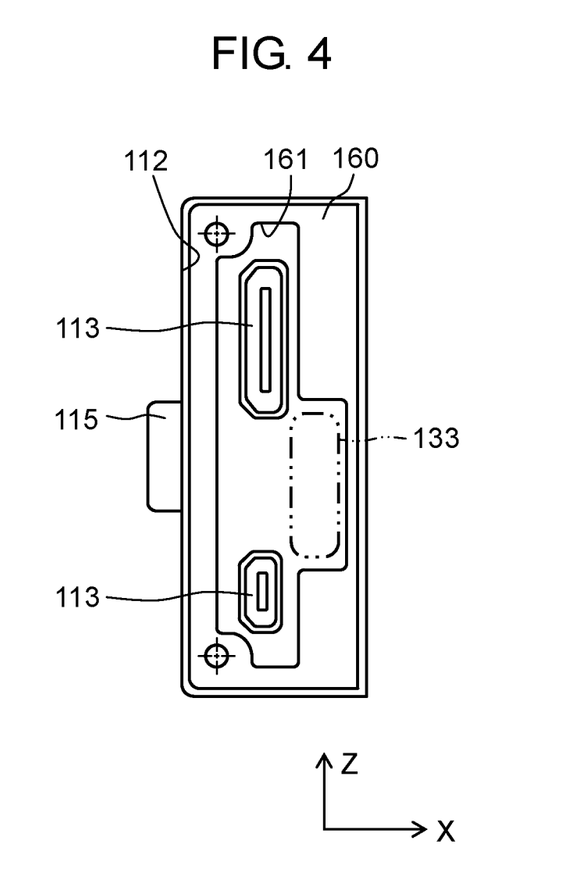
FIG. 4 is a diagram illustrating the details of a body opening of a camera body according to an embodiment.

FIG. 4 is a diagram illustrating the details of body opening 112 of camera body 110 according to the present embodiment.

As illustrated in FIG. 4, guide plate 160 is disposed in body opening 112 of camera body 110. Guide plate 160 has guide hole 161 which terminals 113 and hinge housing 133 can be inserted into and pass through. Guide hole 161 serves as a guide along which hinge housing 133 is inserted when attaching terminal casing 130 (see FIG. 3) to camera body 110 (see FIG. 3). This allows easy attachment of terminal casing 130 to camera body 110.

Camera body 110 has a space inside for storing hinge housing 133 when terminal casing 130 is attached. That is to say, digital camera 100 (see FIG. 1) includes: camera body 110 including terminals 113 for connection with an external device; and terminal cover unit 120 (see FIG. 3) including terminal casing 130 having terminal openings 131 (see FIG. 3) corresponding to terminals 113 and terminal cover 140 (see FIG. 3) which protects terminals 113. Terminal cover 140 includes hinge 142 (see FIG. 3), terminal casing 130 includes hinge housing 133 for housing hinge 142, and camera body 110 has a space inside for storing hinge housing 133. Terminal cover unit 120 is attachable to and detachable from camera body 110 from outside camera body 110. Such a configuration allows attachment of terminal cover unit 120 to a predetermined position of camera body 110.

It should be noted that the space for storing hinge housing 133 may be a hollow region which corresponds to the outer shape of hinge housing 133 and is formed inside camera body 110 as in the present embodiment, or may be, for example, a component which is shaped like a pocket with a hollow region corresponding to the outer shape of hinge housing 133 and is in communication with guide hole 161.

Figure 5:
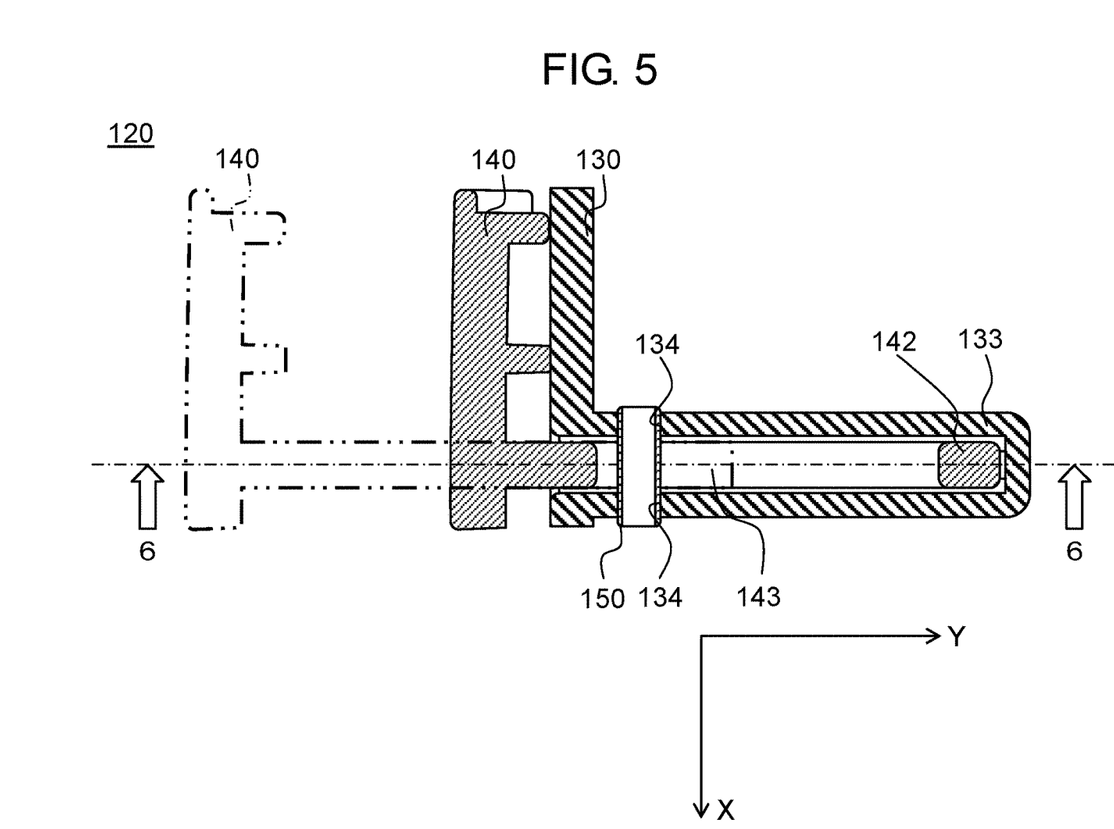
FIG. 5 is a top cross section of a terminal cover unit according to an embodiment.

FIG. 5 is a top cross section of terminal cover unit 120 according to the present embodiment.

As illustrated in FIG. 5, hinge 142 included in terminal cover 140 is housed in hinge housing 133 included in terminal casing 130. Slide pin 150 is inserted into and passes through support holes 134 formed in hinge housing 133 and slide hole 143 formed in hinge 142.

In FIG. 5, the position of terminal cover 140 shown by a solid line is a position when terminal cover unit 120 is in the closed state (will be described later in detail with reference to FIG. 6). The position of terminal cover 140 shown by a two-dot dashed line is a position when terminal cover unit 120 is in the open state (will be described later in detail with reference to FIG. 7). One-dot line 6-6 is the line along which later-described cross sections according to FIG. 6 through FIG. 8 are taken.

Figure 6:
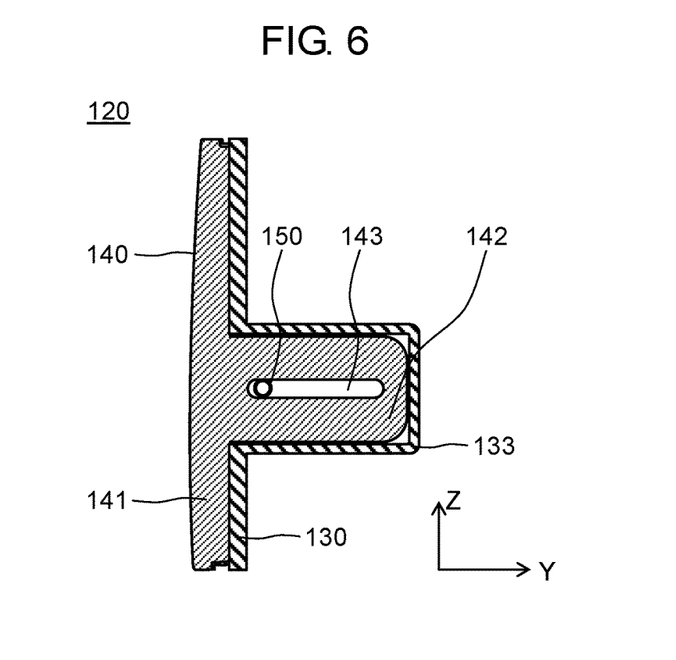
FIG. 6 is a cross section along line 6-6, illustrating a closed state of a terminal cover unit according to an embodiment.

FIG. 6 is a cross section along line 6-6 (see FIG. 5), illustrating the closed state of terminal cover unit 120 according to the present embodiment.

As illustrated in FIG. 6, hinge 142 makes slide movement into hinge housing 133 until protection lid 141 comes in contact with terminal casing 130 as slide pin 150 moves closer to an end of slide hole 143 closer to protection lid 14. As illustrated in FIG. 6, hinge 142 is housed in hinge housing 133 of terminal casing 130 when terminal cover unit 120 is in the closed state. Hinge housing 133 is a component shaped like a pocket in which hinge 142 can be housed. Hinge housing 133 is housed inside digital camera 100 (see FIG. 1) when terminal cover unit 120 is attached to camera body 110. Terminal cover 140 conceals and protects terminals 113 (see FIG. 1) when terminal cover unit 120 is in the closed state.

Figure 7:
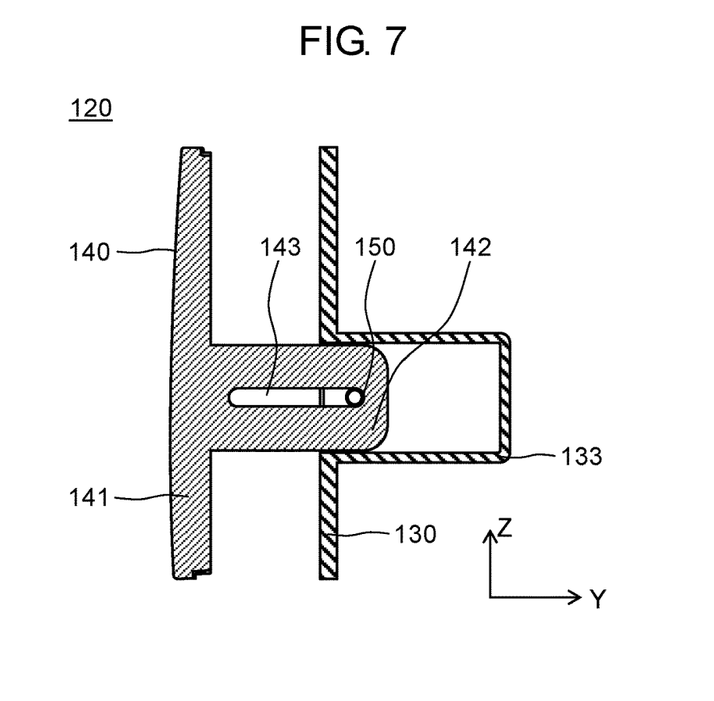
FIG. 7 is a cross section along line 6-6, illustrating an open state of a terminal cover unit according to an embodiment.
Figure 8:
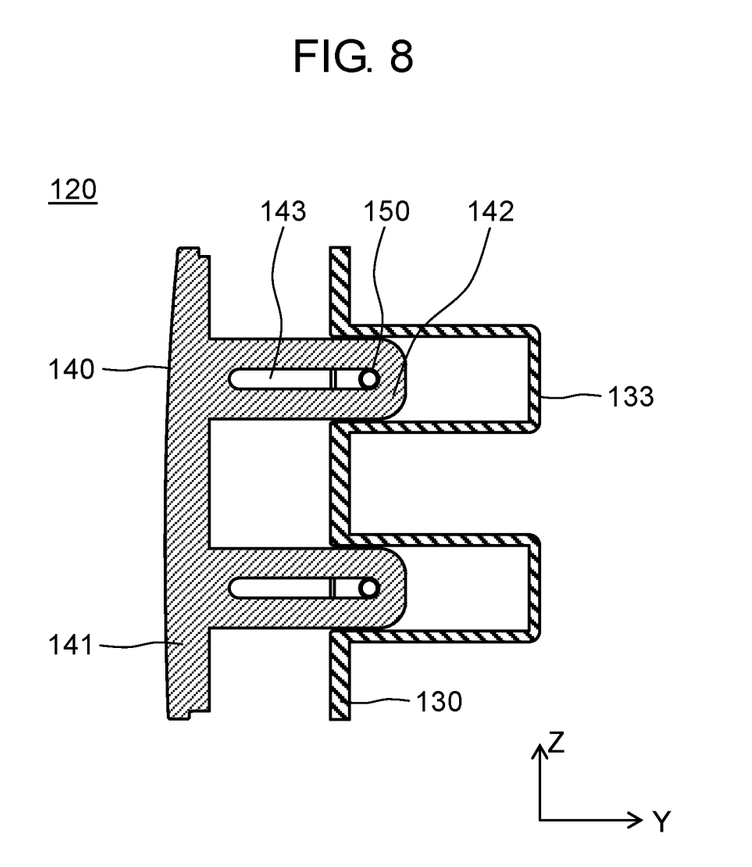
FIG. 8 is a cross section along line 6-6, illustrating an open state of a terminal cover unit according to another embodiment.

FIG. 7 is a cross section along line 6-6 (see FIG. 5), illustrating the open state of terminal cover unit 120 according to the present embodiment.

As illustrated in FIG. 7, hinge 142 makes slide movement toward the outside of hinge housing 133 until slide pin 150 moves to an end of slide hole 143 opposite the end closer to protection lid 141. When terminal cover unit 120 is in the open state, terminal cover 140 exposes terminals 113 (see FIG. 1) so that digital camera 100 (see FIG. 1) is ready to be connected with an external device.

FIG. 8 is a cross section along line 6-6 (see FIG. 5), illustrating the open state of terminal cover unit 120 according to another embodiment.

As illustrated in FIG. 8, two or more of the joint portion which includes hinge 142, hinge housing 133, and slide pin 150 and joins terminal casing 130 and terminal cover 140 may be provided for one terminal cover unit 120. Such a configuration stabilizes the operation performed when terminal cover 140 makes slide movement, and increases the durability of the joint portions.

In the above embodiments, digital camera 100 is an example of an electronic device. Camera body 110 is an example of the body of the electronic device.

Although the above embodiments have described the configuration in which terminal casing 130 is attached to camera body 110 using screws 121, the means for attaching terminal casing 130 to camera body 110 is not particularly limited, so long as terminal casing 130 is attachable to and detachable from camera body 110.

Although the above embodiments have described the configuration in which terminal cover 140 is formed using an elastic material, protection lid 141, which is one of the portions of terminal cover 140 that comes in contact with terminal casing 130, may be formed using an elastic or flexible material. Thus, the material of the other portions of terminal cover 140 is not particularly limited.

Although the above embodiments have described the configuration in which terminal casing 130 and terminal cover 140 are joined using support holes 134 formed in terminal casing 130, slide hole 143 formed in terminal cover 140, and slide pin 150, this configuration is a mere example of the joint portion which separably joins terminal casing 130 and terminal cover 140, and thus the joint portion is not limited to this configuration. Furthermore, slide pin 150 is a mere example of the pass-through component which is removably inserted into and passes through holes, and the pass-through component is not limited to slide pin 150.

The above embodiments have been described with a digital camera taken as an example. However, the electronic device according to the above embodiments is not particularly limited, and the present disclosure is applicable to various electronic devices, such as mobile phones, laptop computers, which include a terminal for connection with an external device. Moreover, the terminal cover unit alone, separately from the electronic device, can be offered to the market as a replacement component.

It should be noted that since the above embodiments are intended to exemplify the techniques according to the present disclosure, it is possible to make, for example, various changes, substitution, addition, and omission within the scope of the claims or in a scope equivalent to the scope of the claims.

The present disclosure is applicable to various electronic devices which include a terminal for connection with an external device.

What is claimed is:

1. An electronic device comprising:
   an electronic device body including a terminal for connection with an external device;
   a body opening around the terminal;
   a body casing that covers a front portion, a back portion, a top portion, and a bottom portion of the electronic device body such that the body casing circumscribes an entryway of the body opening; and
   a terminal cover unit including a terminal casing having an opening corresponding to the terminal and a terminal cover which protects the terminal, wherein
   the terminal cover unit is attachable to and detachable from the electronic device body from outside the electronic device body, the terminal casing is fitted in the body opening from outside the electronic device body, and the terminal casing is removable from the electronic device body while the body casing continues to cover the electronic device body and circumscribe the entryway of the body opening,
   the terminal casing and the terminal cover are separably joined by a joint portion,
   the joint portion is concealed inside the electronic device when the terminal cover unit is attached to the electronic device body, and
   the joint portion includes a first hole formed in the terminal cover, a second hole formed in the terminal casing, and a pass-through component which is removably inserted into and passes through both the first hole and the second hole.

2. The electronic device according to claim 1, wherein the terminal cover includes an elastic material.

3. The electronic device according to claim 1, wherein
   the first hole is a slide hole having an elongated shape and formed in a hinge of the terminal cover,
   the second hole is a support hole formed in a hinge housing of the terminal casing, and
   the pass-through component is a slide pin which is inserted into and passes through the slide hole along which the slide pin makes slide movement, and supported by the support hole.

4. The electronic device according to claim 1, wherein the terminal casing is slidable into the body opening when being fitted into the body opening, and slidable out of the body opening when being removed from the body opening.

5. An electronic device comprising:
   an electronic device body including a terminal for connection with an external device;
   a body opening around the terminal;
   a body casing that covers a front portion, a back portion, a top portion, and a bottom portion of the electronic device body such that the body casing circumscribes an entryway of the body opening; and
   a terminal cover unit including a terminal casing having an opening corresponding to the terminal and a terminal cover which protects the terminal, wherein
   the terminal cover includes a hinge,
   the terminal casing includes a hinge housing for housing the hinge, wherein the hinge housing is formed by a protrusion that extends from an interiorly facing surface of the terminal casing toward an interior of the electronic device body,
   the electronic device body includes a space inside for storing the hinge housing, and
   the terminal cover unit is attachable to and detachable from the electronic device body from outside the electronic device body, the terminal casing is fitted in the body opening from outside the electronic device body, and the terminal casing is removable from the electronic device body while the body casing continues to cover the electronic device body and circumscribe the entryway of the body opening.

6. The electronic device according to claim 5, wherein the terminal casing and the terminal cover are separably joined by a plurality of joint portions.

7. The electronic device according to claim 5, wherein the electronic device is a digital camera.

8. The electronic device according to claim 5, wherein
   the hinge includes a slide hole having an elongated shape,
   the hinge housing includes a support hole, and
   the electronic device includes a slide pin which is inserted into and passes through the slide hole along which the slide pin makes slide movement, and supported by the support hole.

9. The electronic device according to claim 5, wherein the terminal casing is slidable into the body opening when being fitted into the body opening, and slidable out of the body opening when being removed from the body opening.

10. An electronic device comprising:
    an electronic device body including a terminal for connection with an external device; and a terminal cover unit including a terminal casing having an opening corresponding to the terminal and a terminal cover which protects the terminal, wherein the terminal cover unit is attachable to and detachable from the electronic device body from outside the electronic device body, the terminal casing and the terminal cover are separably joined by a joint portion, the joint portion is concealed inside the electronic device when the terminal cover unit is attached to the electronic device body, and the joint portion includes a slide hole having an elongated shape and formed in a hinge of the terminal cover, a support hole formed in a hinge housing of the terminal casing, and a slide pin which is removably inserted into and passes through both the slide hole along which the slide pin makes slide movement and is supported by the support hole.

* * * * *